United States Patent [19]

Flint et al.

[11] 4,241,992
[45] Dec. 30, 1980

[54] RECORDED IMAGE DETECTION SYSTEM FOR UPDATABLE MICROFILM

[75] Inventors: John R. Flint, Barrington; Heinz Hertel, Mount Prospect, both of Ill.

[73] Assignee: Bell & Howell Company, Chicago, Ill.

[21] Appl. No.: 81,972

[22] Filed: Oct. 4, 1979

[51] Int. Cl.³ ............................................. G03B 27/52
[52] U.S. Cl. ...................................................... 355/41
[58] Field of Search ........................ 355/41, 43, 44, 45, 355/53, 54

[56] References Cited

U.S. PATENT DOCUMENTS

| | | | |
|---|---|---|---|
| 3,185,026 | 5/1965 | Carlson et al. | 355/45 X |
| 3,288,024 | 11/1966 | Cronquist et al. | 355/41 |
| 3,677,465 | 7/1972 | Johnson et al. | 355/41 X |
| 4,080,065 | 3/1978 | Spence-Bate | 355/54 |
| 4,174,174 | 11/1979 | Hunter, Jr. et al. | 355/54 X |

*Primary Examiner*—Richard A. Wintercorn
*Attorney, Agent, or Firm*—Alan B. Samlan; John H. Moore; Edward D. Manzo

[57] ABSTRACT

The present invention is used in photo-recording machines, such as microfiche recorders, which receive a document and record an image of the document on a photo-recording medium such as photoplastic film. The invention inhibits double exposures on frames of the film by use of distinctive indicator marks recorded on the film at preselected locations called indicator mark fields. The presence or absence of an indicator mark in such an indicator mark field signifies, respectively, that its corresponding frame is or is not available for recording a document image.

In an improved recorder, prior to a proposed recording, a detector scans the indicator mark field corresponding to the frame selected for recording. If the detector detects an indicator mark, the recorder is inihibited from recording the document in the selected frame. A projection light source forms the image of the indicator mark field and projects it along an optical path in which a sensor of the detector is interposed. Where the indicator mark includes lighter and darker portions, the sensor responds to the intensity variations and may be mounted on motive means and swept thereby across the optical path transversely. The sensor output is automatically evaluated by means which may include or cooperate with a logic circuit responding to an evaluation signal and preventing recording despite a operator-entered record instruction.

If no indicator mark is dectected, document recording proceeds in the selected frame, and an indicator mark is simultaneously recorded in the corresponding indicator mark field.

44 Claims, 8 Drawing Figures

RECORDED IMAGE DETECTION SYSTEM FOR UPDATABLE MICROFILM

BACKGROUND OF THE INVENTION

The present invention relates to updatable photoplastic film recording and display devices and more particularly to a system to safeguard against double exposure of any frame on a microfilm or microfiche.

Microfilm recording is a process wherein photographically reduced images of objects, generally documents, are sequentially formed and recorded in successive frames on a reel of microfilm or on distinct frames of a fiche. Typically, a fiche conforms to standards set forth by the National Microfilm Association and contains ninety-eight frames, each having a particular size and location with respect to the overall fiche. One type of fiche in use today includes a photoplastic film which is updatable, that is, in which a frame containing a first recorded image may record a second new image thereover. When that happens, the first recorded image is lost or the frame is double exposed. While systems using updatable film have the advantage of recording over unwanted data, they are correspondingly subject to accidental recording over images which should be preserved.

One system which treats this problem is disclosed in "Photoplastic Film Recording and Monitoring Apparatus", U.S. Ser. No. 873,932 filed Jan. 31, 1978 by Gordon Lysle and Kenneth R. Baur, assigned to Bell & Howell, now abandoned. According to one embodiment of a photoplastic displays any document image which may have been previously recorded in the frame selected by a user for recording a (further) document. Thus, a manual inspection is necessary for each frame to insure against double exposures or accidental erasure.

A second embodiment described therein includes blank or occupied based on the surface alterations of the frame upon document recording. Briefly, a surface-viewing sensor unit is mounted on a shutter above the recording station. The sensor unit contains a small light source and a light sensitive diode. The sensor light is projected onto the frame and is reflected upwardly thereby. If the fiche is perfectly flat, the reflection will be detected by the light sensing diode and will release a control system for permitting recording. If, however, the frame is occupied by a recorded image, the film will have a bowed configuration or distortion which will deflect the light away from the sensor diode. The failure to receive a return signal by the sensor actuates an interlock system which prevents a recordation cycle when a RECORD command is entered by the user.

However, when a user erased a previously recorded document image so that a subsequent document image could be recorded, the erasure occasionally left some ripples in the photoplastic film surface. Those ripples caused the sensor unit to interpret the erased frame as an occupied image was automatically inhibited.

Accordingly, the principal object of the present invention is to provide a more reliable detection system for a photorecorder to detect whether a frame aligned in the recording station of the recorder already contains an image, and if so, to inhibit the recorder from recording

SUMMARY OF THE INVENTION

In accordance with various aspects of the present invention, a photo-recording medium such as photoplastic film in microfilm or microfiche format, for example, is arranged to include an indicator mark area or "field" defined at a respective predetermined location on the mark in such an indicator mark field signifies that its corresponding frame is not available for recording a new document image, i.e. that the frame is occupied. Prior to a proposed recording, a detector scans the indicator mark field corresponding to the frame which has been aligned in the recorder. If the detector detects the indicator mark, the recorder is prevented from recording the document in the selected frame. If no indicator mark is detected, document recording proceeds in accordance with a user-entered recording instruction. An indicator mark generator causes the recording of an indicator mark comprising a distinct and machine detectable pattern or marking in the corresponding indicator mark field.

In the illustrated embodiment, the image of the indicator mark field of the particular frame aligned for a document recording is projected along an optical path in which a scanning sensor is interposed. Illustratively, the indicator mark includes lighter and darker portions corresponding to a "master target" in an indicator mark generator. The sensor responds to the intensity variations of the indicator mark and may take the form of, for example, a photosensitive semiconductor device relatively movable with respect to the optical path. For example, the semiconductor device may be mounted on motive means to be swept across the optical path transversely or means can be provided for moving the optical path—either by mirror adjustment or physically moving the microfiche. The sensor output is evaluated by means which may include or cooperate with a logic circuit responding to an evaluation signal and preventing recording despite the operator-entered record instruction.

In the exemplary embodiment, an indicator mark generator passes a light beam through a "master target" which forms the image of an indicator mark in the beam. Appropriate guidance means such as mirrors direct the beam to a predetermined position with respect to the frame aligned in the recording station, wherein the recorder section of the recorder records the indicator mark image contemporaneously with recording the document image.

According to still another aspect of the invention, the indicator mark generator can be combined with the detector as a single assembly. Typically, a microfiche or other photoplastic film recorder forms a document-bearing image which is directed by appropriate means such as one or more mirrors to a recording station. Advantageously, the generator-detector assembly is situated in the recorder so that during the recording stage the indicator mark beam passes from the generator through an aperture in one of such mirrors and travels beside the document image bearing beam, the two beams nearly converging at the frame selected for document recording. During the prior detection stage, an image of the indicator mark field is formed by a projection lamp proximate the microfiche. That image is then scanned for the presence of an indicator mark, and travels along the same optical path, but in a reverse direction, as a beam carrying an indicator mark image to the recording station would travel in the recording stage. By virtue of the mirror aperture, the indicator mark beam and document image bearing beam do not interfere with one another during recording or detection.

BRIEF DESCRIPTION OF THE DRAWINGS

Further features and advantages of the invention will become more apparent from the following detailed description wherein reference is made to the accompanying drawings wherein.

DETAILED DESCRIPTION OF A PREFERRED EMBODIMENT

Figure 1:
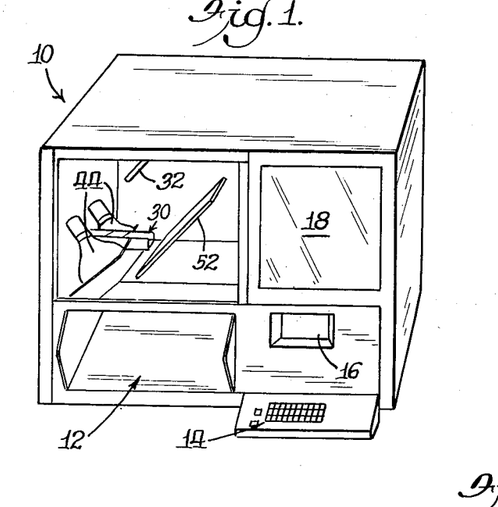
FIG. 1 is a view of a microfiche recorder.

FIG. 1 illustrates a microfiche recorder 10. A document to be recorded is inserted into a chamber or copy holding station 12 and its image is recorded, upon a command entered by a user via a control panel 14, on a frame of a microfiche which has been inserted into a chamber 16. Document images recorded on any particular frame of the microfiche may be displayed on a screen 18 upon appropriate commands entered via panel 14.

Figure 2:
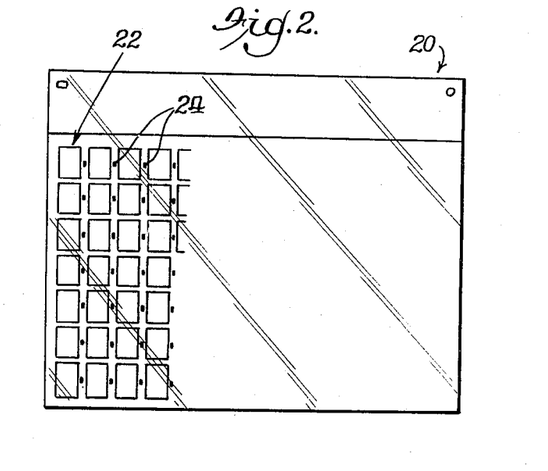
FIG. 2 is an enlarged plan view of a microfiche having indicator marks according to the present invention.

FIG. 2 illustrates a microfiche 20 according to the present invention showing a plurality of ordered frames 22 for recording documents thereon. Adjacent each frame 22 is a corresponding indicator mark field 24. Advantageously, the indicator mark field 24 is along a center line bisecting varying magnifications.

Figure 3:
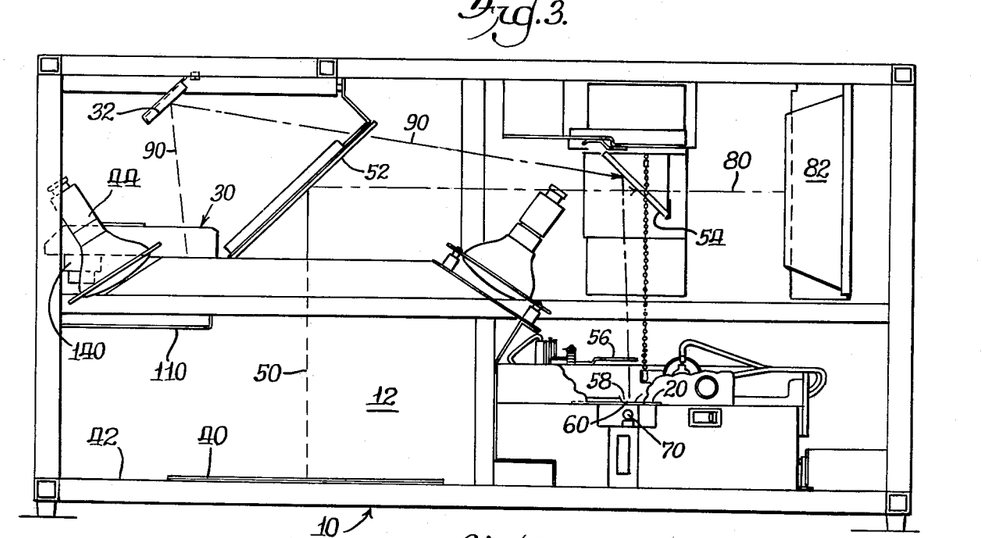
FIG. 3 is a front view of the recorder of FIG. 1 with parts broken away.

FIG. 3 illustrates a recorder 10 according to the present invention. Except for an indicator mark generator/detector assembly 30 and its associated mirror 32, recorder 10 is typical in its configuration. Briefly, however, a document 40 for recording is placed in the command entered via control panel 14 (FIG. 1), a set of flood lamps 44 illuminate the copy holding station 12. A beam carrying the image of document 40 travels along an optical path 50 and is directed toward the recording side of recorder 10 by a mirror 52. A second mirror 54 mounted on a movable mechanism (not shown) directs the document image bearing beam downward. A swinging shutter 56 is interposed in optical path 50 to admit or reject the image bearing light beam to a lens assembly 58. Typically, one of a plurality of lenses mounted for instance on a turret (not shown) is selected and positioned in optical path 50 so that when shutter 56 opens, the image bearing light beam passes through an aperture 60. A carriage (not illustrated) for supporting fiche 20 beneath aperture 60 is connected to controllable means for positioning fiche 20 at any selected one of a plurality of frames. A heated metallic block is movably mounted so that it can be thrust forward for contact with the accessible area of microfiche 20 in its proper position. Recording of the document image may be in accordance with any apparatus or method used by those skilled in the art for this purpose. Illustratively, and as described in greater detail by Lysle and Baur in U.S. Ser. No. 873,932, now abandoned, such apparatus may include a corona generating element within a box or enclosure for applying an electrostatic charge to a fiche at an image plane. At an appropriate time, the corona generator will be energized to apply an electrostatic charge to the fiche at the image plane within a frame area immediately below the corona box. Simultaneously, the optical image is projected from the copy holding station 12 through the means described above onto the frame of the fiche. This establishes the electrostatic image pattern within the photoplastic layer of the fiche. The corona generator is then deactivated, and within one to four seconds thereafter, depending upon an adjustable setting of the machine, the heat block is brought into a position where it projects against the underface of the film at image plane. However, before the heat block engages the film, the shutter 56 is moved to interrupt optical path 50 thereby preventing blurring of the image if the film is vibrated or jarred by engagement of the heat block. The temperature of the heat block is maintained through thermostatically controlled electrical heaters at a predetermined level which within about one-half of one second of contact with the film surface "develops" the image therein through ripple inducement, and after approximately one-half of one second of film contact the heat block is retracted.

The image recorded on the frame can be observed on screen 18 (FIG. 1) by causing a projection lamp 70 beneath platen 62 to illuminate the selected frame of microfiche 20 and form a display beam. Shutter 56 is opened to allow the display beam to encounter mirror 54 which is rotated by its movable mechanism to direct the display beam along an optical path 80 onto a reflector 82 which redirects the display beam onto display screen 18 (FIG. 1) for viewing.

In the illustrated embodiment, a portion of the light from flood lamps 44 is used to illuminate an indicator mark master target (described in detail infra) within generator/detector assembly 30 to form and project a beam carrying an image of the indicator mark. That indicator mark-bearing beam travels upward from generator/detector assembly 30 along an optical path 90 and is reflected by an appropriately positioned mirror 32 toward the recording side of recorder 10. Optical path 90 passes through a notch 91 in mirror 52 (seen most clearly in FIG. 4) and is reflected by mirror 54 toward microfiche 20. Optical path 90 nearly converges with optical path 50 at microfiche 20 and is focused on the indicator mark field 24 corresponding to the frame 22 in the recording position so that the indicator mark image is recorded on microfiche 20 by the heater block and corona generator equipment of the recorder at the same time, preferably, that the image of document 40 is recorded. Advantageously, the indicator mark field 24 area so that the same heater block and corona generator equipment can be used to record the indicator mark and the document image simultaneously.

Figure 4:
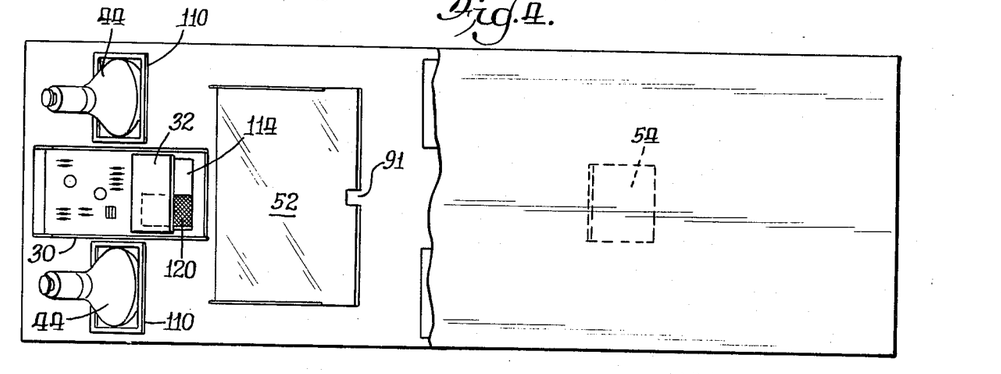
FIG. 4 is a plan view of the left half of the recorder device of FIG. 1 with parts broken away.
Figure 5:
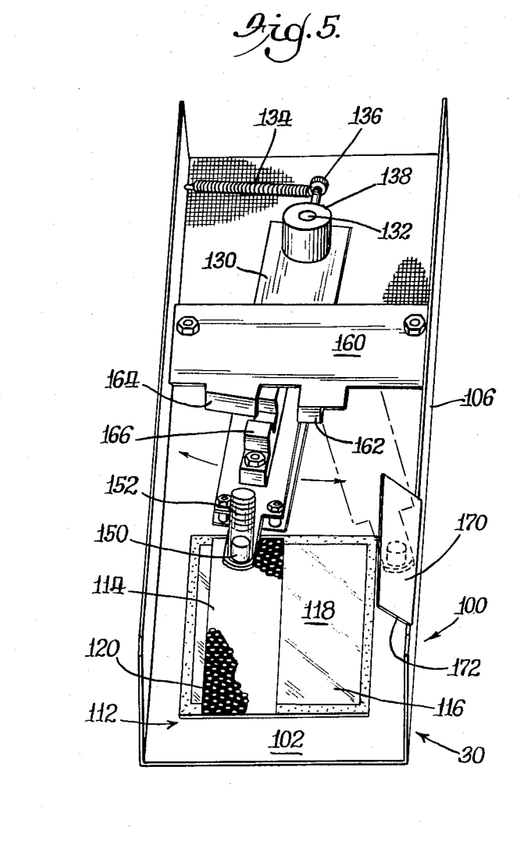
FIG. 5 is a view of an indicator mark generator and detector assembly according to one embodiment of the present invention.

FIG. 4, a plan view of the left half of recorder 10, with parts broken away, and FIG. 5, an orthogonal view of indicator mark generator/detector 30 assembly, show the relative positioning and mechanical elements of generator/detector assembly 30. In the embodiment described herein, the indicator mark generator is combined with an indicator mark detector in one assembly, but it will be appreciated that the generator could be separate from the detector. However, it is advantageous to combine the generator and detector to simplify add-on installation and reduce the optical paths to a minimum.

Referring to FIG. 5, generator/detector assembly 30 is built on a chassis 100 which is generally U-shaped in cross-section, having a base 102 and walls 104 and 106 extending perpendicularly therefrom. Generator/detector assembly 30 is mounted with respect to the recorder 10 illustratively so that base 102 lies in a plane parallel to the copy plane of document 40, but it will be understood that it may take virtually any orientation. Generator/detector assembly 30 is positioned superjacent or above one or several flood lamps 44. A light reflector 110 (FIG. 3) is relatively oriented with respect to flood lamps 44 and generator/detector assembly 30 so that most of the generated light passes around deflector 110 to illuminate document 40. Some of the light is reflected by deflector 110 through an aperture in base 102 which supports a "master target" 112 to form the image of an indicator mark. Light passing through master target 112 travels along optical path 90 to the recording station so that the indicator mark image formed by the generator portion of generator/detector assembly 30 will be recorded at field 24.

In the exemplary embodiment, a machine readable pattern is formed by master target 112 having contrasting left and right halves, 114 and 116, respectively. This contrast pattern in the master target 112 is recorded in indicator mark field 24 when field 24 is subsequently tested in preparing for a subsequent recording, the contrast pattern constitutes the primary characteristic for automatic detection. It will be appreciated by those skilled in the art, that other characteristics can be employed in conjunction with suitable corresponding detectors.

In FIG. 5, a contrasting surface in master target 112 is supported by a thin pane of glass 118 which is affixed to base 102 by epoxy or cement or other suitable means and covers at least one portion such as the left half 114 of master target 112. That left half of glass 118 is covered with light interrupting means such as a half tone mask 120 which provides area fill suited to the recording characteristics of recorder 10. Such means can be silk screened onto glass 118, or applied via tape, etching, scribing, or any other means for developing a machine-recognizable characteristic. The right half 116 of master target 112 is clear, thus providing a difference in transmissivity between left and right halves of master target 112.

Figure 6:
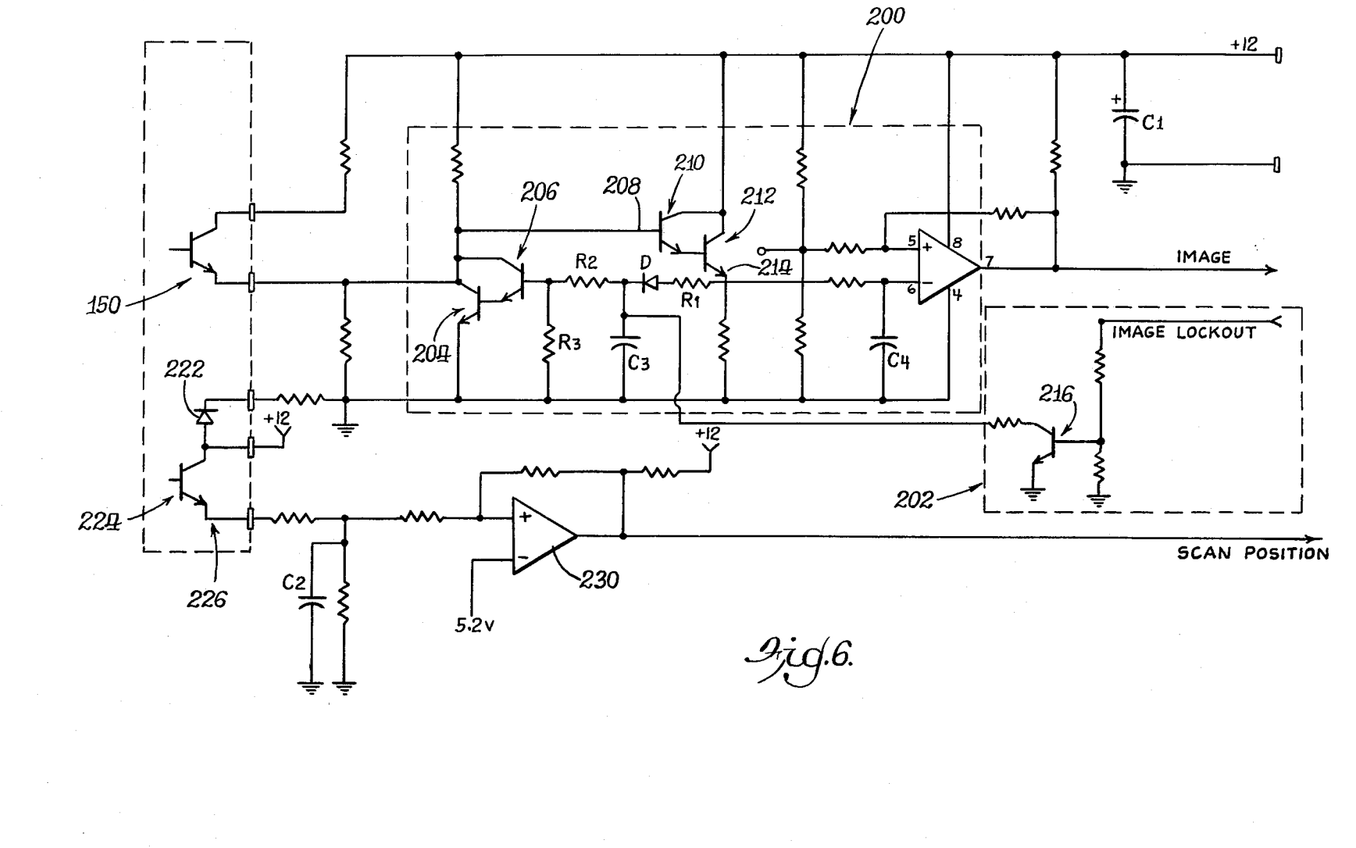
FIG. 6 is a schematic diagram of a circuit used in the indicator mark detector portion.

The detector portion of generator/detector assembly 30 includes further mechanical components shown in FIG. 5 and an electronic circuit shown schematically in FIG. 6. The detector portion detects images of the master target 112, and cooperates with projection lamp 70 and optical path 90 to test for the absence or presence of an indicator mark recorded in the field 24 corresponding to the frame 22 aligned with optical path 50 in the recording station. In the illustrated embodiment a single appropriately oriented light sensor is mechanically swept across optical path 90, and the sensor output at different sweep positions is evaluated. It will be apparent that the sensor arrangement for the test could take a variety of forms, such as two stationary sensors, one positioned over the lighter half 116 of master target 112 and the other positioned over the darker, area-filled half 114. Or, a single sensor may be used and optical path 90 can be moved across the sensor by rotating mirror 32 or 54, for example. Alternatively, the overall intensity of the image recorded in indicator mark field 24 may be measured or compared against some standard. Other arrangements will occur to those skilled in the art.

In the illustrated embodiment, a swing arm 130 (FIG. 5) is suitably mounted for rotation about an axis 132 and is biased by a coil spring 134 (fastened to wall 102 and to arm 130 by a set screw 136 supported by a shaft 138). The rest position of arm 130 is shown in phantom in FIG. 5. Axis 132 engages an electric motor 140 (seen most clearly in FIG. 3) mounted beneath base 102. Motor 140, when activated, rotates arm 130 clockwise so that the extreme end thereof sweeps across master target 112. A photosensitive semiconductor device 150 is mounted to arm 130 so that as arm 130 sweeps through an arc, sensor 150 sweeps across master target 112. Sensor 150 is positioned to have its aperture oriented upward to receive light traveling along optical path 90 toward detector/generator assembly 30. A hollow tubular shield 152 is mounted around sensor 150 to prevent light which is not traveling along path 90 from reaching sensor 150.

To record a document on a selected frame of the fiche 22, a record command is applied via control panel 14, and mirror 54 is then moved automatically to the recording position. Projection lamp 70 is activated by appropriate circuitry for a time period at least as long as the time needed for one sweep of sensor 150 across master target 112. If the indicator mark field 24 is free of an indicator mark, then sensor 150 will detect a substantially constant light level as it sweeps across the projected image of the indicator mark field. If, however, an indicator mark is recorded in field 24, its image will travel along light path 90 and be scannned by sensor 150. That indicator mark image is substantially the same as the image formed by master target 112. Because of the contrasting light transmissivity of halves 114 and 116, sensor 150 will manifest a detectable resistance, current or voltage change when, during its movement, it reaches the light level transition in the image corresponding to the pattern of previously recorded master target 112. Appropriate circuitry coupled to sensor 150 detects the signal change and automatically prevents recorder 10 from recording on frame 22. If such recording is, in fact, intended, an override command can be entered by the user on control panel 14.

The embodiment illustrated in the figures prevents recording despite a record request in the event that the swing arm 130 does not sweep properly. Structure for determining the position of swing arm 130 includes a platform 160 that spans sidewalls 104 and 106 of chassis 100 so that arm 130 moves in a plane between platform 160 and base 102. First and second encoders 162 and 164 project downward from platform 160. Encoders 162 and 164 are positioned to obstruct the optical path between a light emitting diode and a photosensitive semiconductor sensor combination 166 in respective portions of a housing which is affixed to arm 130 by suitable means. Finger 162 is positioned so that it obstructs the light path of optical switch 166 when sensor 150 is over the clear right half 116 of master target 112, and so that the optical path becomes unobstructed as sensor 150 moves over the darker left half 114. Encoder 164 is positioned so that the path of optical switch 166 is obstructed again when sensor 150 projects over the darker left half 114 near the end of its travel. Thus, signals from switch 166 indicate travel of swing arm 130.

A reference light level against which to compare the light in the beam generated by projection lamp 70 for indicator mark detection is provided by a shelf 170 mounted to wall 106. Shelf 170 includes a shiny undersurface which reflects light passing through the clear half 116 of master target 112 onto sensor 150 in its rest position. Shelf 170 includes a cantilevered portion which, in the embodiment shown, projects over base 102 up to the edge of master target 112 nearest wall 106.

Figure 7:
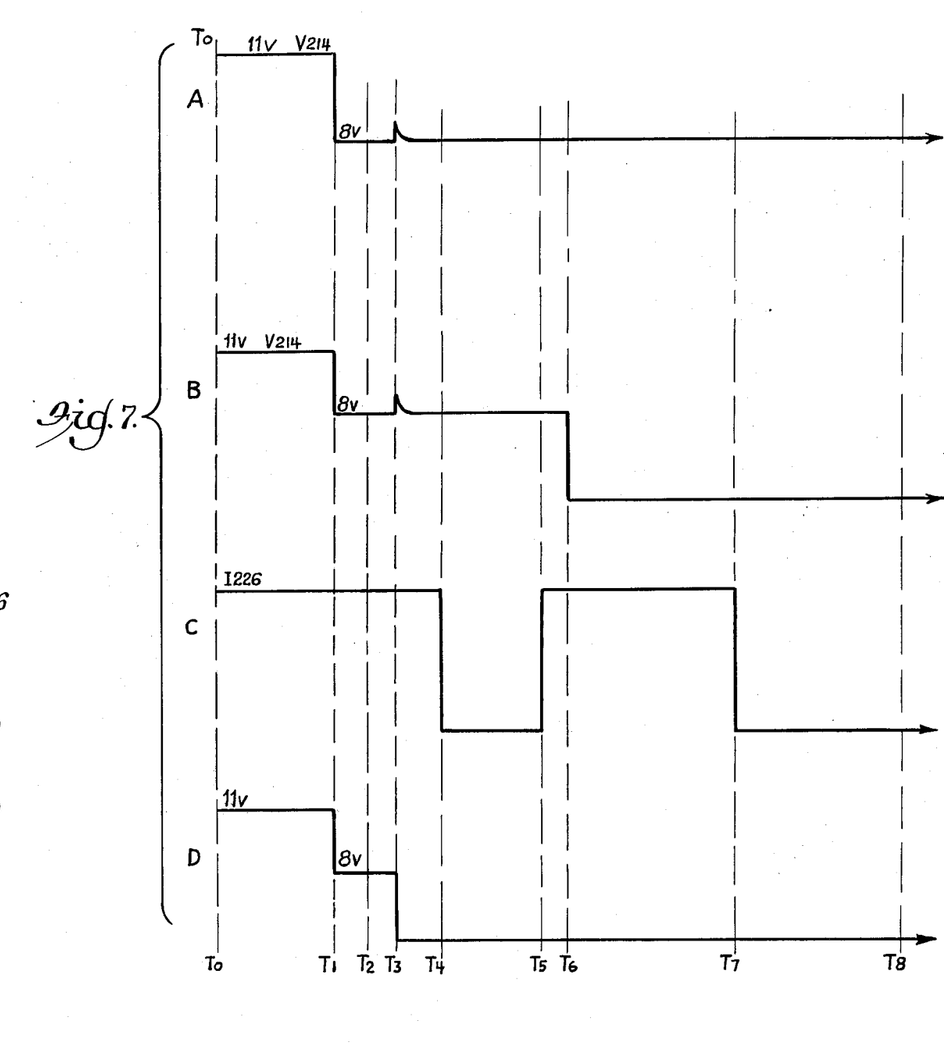
FIGS. 7A, 7B, 7C and 7D are diagrams useful in understanding the operation of the circuit of FIG. 6.

FIG. 6 schematically shows sensor 150 as a photosensitive semiconductor whose emitter is coupled to a voltage restoring circuit 200 which cooperates with a clamp circuit 202. Voltage restoring circuit 200 functions to maintain a circuit point at a certain level despite long term variations in the output of sensor 150 due to, for example, intensity deterioration of projection lamp 70 or dirt collecting on mirrors 54 or 32. More specifically, the emitter of sensor 150 is coupled to the common collectors of a Darlington pair of transistors 204 and 206 forming a current sink. FIGS. 7A and 7B illustrate the voltage levels at the emitter 214 of transistor 212. Details of a similar voltage restoring circuit are set forth in U.S. Pat. No. 4,027,154. Briefly, though at a time $T_0$ prior to a record command entered by a user on control panel 14, transistor 216 of clamp circuit 202 is caused to conduct, which in turn, discharges capacitor $C_3$ cutting off transistors 204 and 206 and permitting the voltage at point 214 to reach about eleven volts. At the time $T_0$, arm 130 is in its rest position and sensor 150 is beneath shelf 170. Lamps 44 illuminate deflector 110 and the document 40 to be copied. Some diffuse light from deflection 110 is reflected from the underside of shelf 170 and generates a current the clamp 202 is turned off allowing $C_3$ to charge, transistors 204 and 206 to conduct, and $V_{214}$ to stabilize at about 8 volts, as controlled by the voltage divider $R_2$ and $R_3$, as shown in FIGS. 7A and 7B. At time $T_2$, shaft 132 driven by motor 140 (FIG. 3) is activated and sensor 150 begins to arc across base 102. At time $T_3$, sensor 150 emerges from beneath shelf 170 and receives light (illustratively more intense than the light reflected by shelf 170) derived from projection lamp 70 via optical path 90. The voltage at the emitter of device 150 tends to rise, making transistors 210 and 212 more conductive and causing a small rise or "glitch" as shown at $T_3$ in FIG. 7A. However, voltage restoring circuit 200 acts to stabilize the voltage rise by virtue of the illustrated feedback arrangement. As a result, current passes from the collector to the emitter of transistor 204, thereby stabilizing voltage $V_{214}$. This voltage remains at a constant level, as shown in FIG. 7A, due to voltage restoring circuit 200, if the light received in sweeping sensor 150 across aperture 112 remains generally constant, i.e. if the indicator mark is absent, irrespective of long term changes in the light level as described above.

FIG. 7B indicates voltage $V_{214}$ where the indicator mark is encountered. At time $T_{6'}$, sensor 150 enters the darker half of the indicator mark beam and the voltage at the emitter of transistor 150 drops due to the major change in light intensity. This shuts down Darlington transistors 210 and 212 and the voltage emitter 214 accordingly drops. Voltage $V_{214}$ is used as a logic signal. It is inverted by comparator 220, whose output is designated in FIG. 6 as IMAGE.

Optical switch 166 (FIG. 5) is shown schematically in FIG. 6 as a light emitting diode 222 and photosensitive semiconductor device 224. FIG. 7C shows the current $I_{226}$ through emitter 226 of semiconductor device 224.

Figure 8:
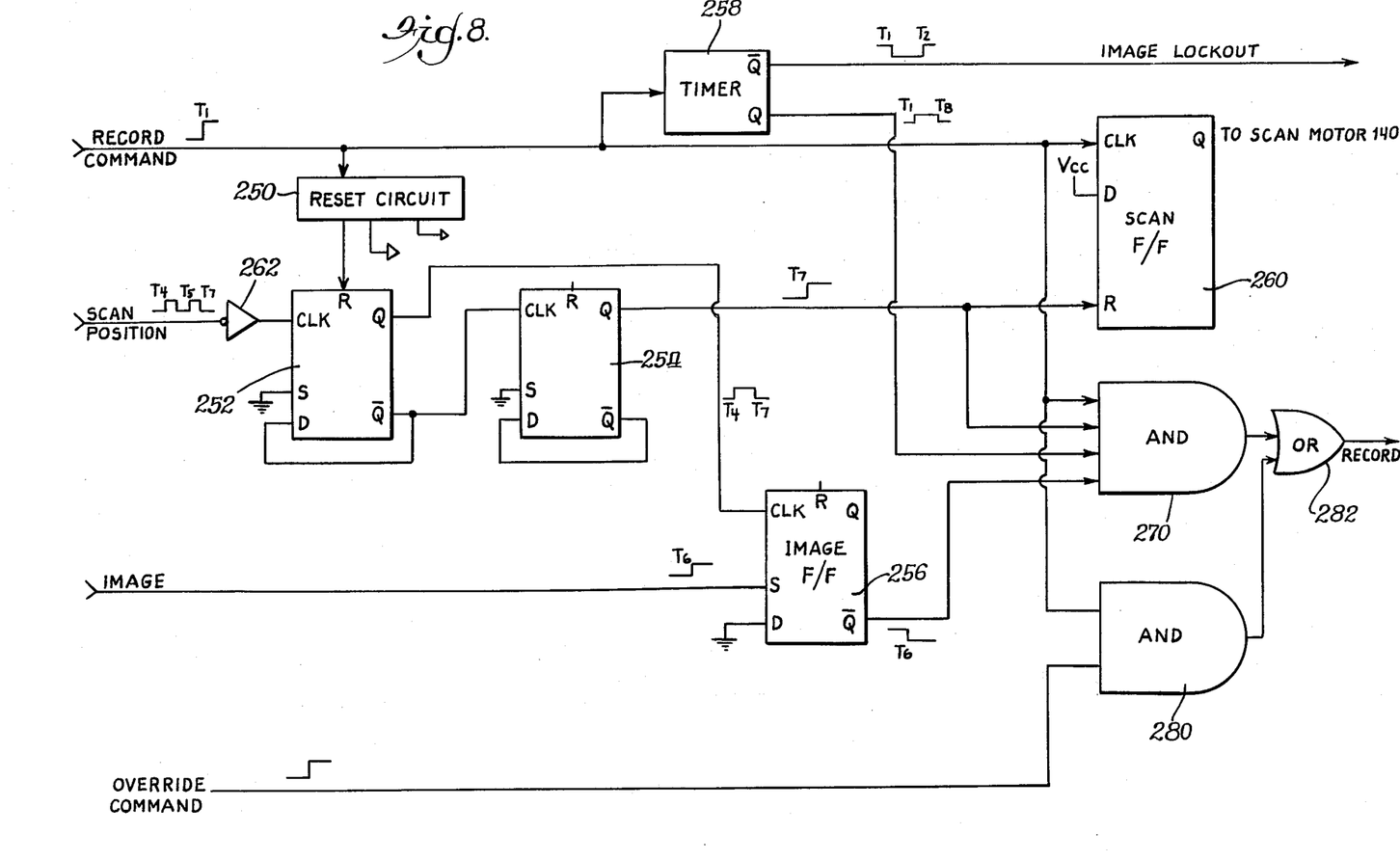
FIG. 8 is a block diagram of logic circuitry which cooperates with the circuit of FIG. 6.

At time $T_0$ swing arm 130 is in rest position, and there is no obstruction in the optical switch so that current $I_{226}$ is at a high level. As swing arm 130 moves through its arc, finger 162 is encountered at time $T_4$. It obstructs the light path and causes a current drop as shown in FIG. 7C. At time $T_5$, optical switch 166 clears finger 162 and the current level accordingly rises. A further current drop occurs at time $T_7$ when encoder 164 is encountered. These current signals are applied to an amplifier 230 whose output to logic circuitry of FIG. 8 is denoted SCAN POSITION. In the logic circuitry thereof, the high-to-low transition is inverted and thereafter used to clock various circuit elements.

Referring to FIG. 8, when the recorder operator enters a RECORD command at control panel 14, a reset circuit 250 resets D-type flip-flops 252, 254, and 256, whereupon the Q output of each flip-flop is set low and $\overline{Q}$ is set high. Also, a timer 258 is activated, and one of its outputs IMAGE LOCKOUT de-activates clamping circuit 202 of FIG. 6. Further, a flip-flop 260, which controls scan motor 140, is clocked by the RECORD command. The Q output of flip-flop 260 activates scan motor 140.

At time $T_4$, the SCAN POSITION output of FIG. 6 goes low and, in FIG. 8, after inverting by inverter 262 clocks flip-flop 252. The Q output of flip-flop 252 thereupon goes high and clocks "image register" flip-flop 256. At time $T_6$, sensor 150 will encounter the light-to-dark transition of the indicator mark, if present. If sensor 150 detects the transition, voltage $V_{214}$ goes low, but is inverted by comparator 220 so that the IMAGE input to FIG. 8 goes high to set flip-flop 256. At time $T_7$, the optical switch 166 emits a high-to-low transition which is inverted by inverter 262 and clocks flip-flop 252, whose Q output then changes from low to high thereby clocking flip-flop 254. The Q output of flip-flop 254 thereupon goes high and applies a logic high signal to AND gate 270.

AND gate 270 receives four signals necessary to output a positive signal which will cause recorder 10 to record: (1) the signal from flip-flop 254 indicating that arm 130 has scanned across the whole or at least the necessary part of the beam carrying the image of the indicator mark field; (2) a logic signal indicating that a RECORD command has been entered by the operator on control panel 14; (3) a signal for a limited duration from timer 258; and (4) a signal from the "image register" 256 indicating the absence of an indicator mark. All four signals must be high for AND gate 270 to issue a modified RECORD command to recorder 10.

For overriding the automatic inhibit function, the RECORD command is also inputted to a further AND gate 280, which also receives a user-entered OVERRIDE signal. When the RECORD and OVERRIDE signals coincide, a signal from AND gate 280 is inputted to an OR gate 282 and passes therethrough to constitute a modified RECORD command.

When the Q output of flip-flop 254 goes low-to-high, it indicates that the second encoder 164 has been encountered and signals circuit 272 to de-activate motor 140. Arm 130 thereupon returns to its rest position.

Referring to FIG. 7D, in the event that projection lamp 70 is burned out or one of the mirrors is wrongly positioned or dirty, then at $T_3$, when sensor 150 clears shelf 170, a low light level will be encountered and $V_{214}$ will drop, thereby precluding the issuance of a modified RECORD command from AND gate 270. If something is wrong with the motor or swing arm assembly, and encoder 64 does not obstruct optical switch 166, the current drop shown at $T_7$ of FIG. 7C will not occur and gate 270 will not output a RECORD command. Further, unless all signals occur before expiration of the timing signal and timer 258, no RECORD signal will issue.

When it is desired to erase an occupied frame, the operator depresses an erase button on control panel 14. The hot block is activated and its temperature is increased to erase level and it is moved into contact with the fiche for a timer interval sufficient to erase the image in said frame 22 and the indicator mark in field 24. It then retracts back to rest position and a new image can then be recorded in the erased frame if desired without automatic inhibition since no indicator mark will be detected by generator/detector assembly 30.

We claim:

1. An indicator mark generator and detector assembly for use with a photo-recorder for recording the image of a document selectively at one of a plurality of individual frames on a photo-recording medium upon a RECORD command, the generator-detector assembly operating selectively to cause the recording of an erasable indicator mark at a predetermined indicator mark field on said photo-recording medium signifying the recording of an image on said frame, and further operating to detect the presence or absence of an indicator mark in or from an image of said indicator mark field formed by cooperating means for projecting the image recorded at said indicator mark field along an optical path, said generator and detector assembly comprising:

sensor means interposed in said optical path responsive to the image of said indicator mark for exhibiting a first output when said indicator mark is present and a second output when said indicator mark is absent;

control means responsive to a selected one of said first and second outputs for preventing said recorder from recording said document image if said sensor means indicates the presence of said indicator mark;

means for defining an indicator mark-generating light beam and for forming a machine-readable and photo-recordable image in said light beam; and means directing said indicator mark-generating light beam to said indicator mark field, said indicator mark field being positioned so that said recorder records said indicator mark thereon.

2. The generator-detector assembly of claim 1 wherein said sensor means comprises an optical sensor outputting an electrical signal which varies with sensed light intensity.

3. The generator-detector assembly of claim 2 wherein said control means compares said outputted electrical signal to a reference electrical signal.

4. The generator-detector assembly of claim 3 further comprising means for directing a reference light level to said sensor means, said sensor output defining said reference signal.

5. The generator-detector assembly of claim 4 wherein said reference light level directing means comprises a shelf directing light from a light source onto said sensor means.

6. The generator-detector assembly of claim 1 wherein said means for defining and forming comprises a master target supported on a chassis defining an aperture through which light passes, said master target including means for interrupting light covering a portion of said aperture.

7. The generator-detector assembly of claim 6 wherein only a portion of said master target is covered and wherein the output of said sensor means when the uncovered portion is sensed corresponds to a reference signal for said control means, and wherein said control means responds to variations from said reference signal in the output of said sensor means.

8. The generator-detector assembly of claim 7 wherein said sensor means includes first and second sensors positioned at respective first and second positions with respect to said optical path, said first position corresponding to said covered aperture portion and said second position corresponding to said uncovered aperture portion.

9. The generator-detector assembly of claim 7 further including means for moving said optical path relative to said sensors.

10. The generator-detector assembly of claim 7 wherein said sensor means comprises a photosensitive device and means for moving said device across said optical path.

11. The generator-detector assembly of claim 10 wherein said moving means comprises an arm operatively engaging said motive means, said device being affixed to said arm, said arm moving in a plane perpendicular to said optical path.

12. The generator-detector assembly of claim 11 further comprising means for indicating the position of said arm.

13. The generator-detector assembly of claim 12 wherein said position indicating means includes a switch on said arm and means activating said switch when said device reaches a preselected position with respect to said optical path, said preselected position being within the covered portion of said optical path when said indicator mark is present in said indicator mark field.

14. The generator-detector assembly of claim 13 wherein said switch is an optical switch and said means activating said switch is an encoder held in a fixed position with respect to said recorder and interrupting the optical path of said optical switch when said arm reaches said fixed position.

15. The generator-detector assembly of claim 12 wherein said control means includes a logic circuit responsive to said position indicating means and to said sensor means output for inhibiting said recorder from recording said document image if an image corresponding to said master target is detected.

16. The detector of claim 1 wherein said control means includes a voltage restoring circuit maintaining a voltage at a particular point therein substantially at a constant level despite long term differences in the output of said sensor means, said voltage restoring circuit responding to major variations in the output of said sensor means due to major changes in the level of light incident on said sensor means at said differing parts of said optical path to provide a detectable voltage difference at said circuit.

17. In an improved photo-recorder of the type having a station for holding a document to be recorded, lamps illuminating said document, means defining a first optical path along which an image of said document travels from said document station to a recording station, means for positioning a frame of said film in a predetermined relationship with said recording station, recording means for recording said document image on said frame in response to a RECORD command, the improvement comprising:

means for scanning an indicator mark field corresponding to said frame and positioned in a predetermined relationship with respect thereto prior to document recording, said scanning means automatically determining the presence or absence of an indicator mark recorded at said indicator mark field, said scanning means cooperating with said recorder for inhibiting document recording at said frame if said indicator mark is determined to be present at said corresponding indicator mark field;

means cooperating with said recording means and responsive to said scanning means for forming and projecting the image of an indicator mark along a second optical path to said corresponding indicator mark field for recording thereon by said recording means; and a mirror reflecting said first optical path, said mirror including an aperture, said second optical path passing through said aperture.

18. The improvement of claim 17 wherein said scanning means forms an image of said indicator mark field, including any mark recorded therein, and transmits said image in a reverse direction substantially along said second optical path.

19. In a recorder for recording images of documents on a photoplastic film, a method of automatically determining whether a frame for proposed recording has a previously recorded image on said frame, said method comprising:

projecting an image of an indicator mark field, corresponding to said frame, which includes a distinctive erasable indicator mark therein whenever a frame has a document image recorded thereon;

establishing a light level reference signal;

generating signals representing the light levels at various points within said indicator mark image; and comparing said light reference signal with said signals indicating the detected light levels in said image.

20. The method of claim 19 wherein said generating step includes moving a sensor across said image of said indicator mark field.

21. In a photo-recording device for recording document images on photo-recording medium, a method comprising:

defining an indicator mark field for each frame of said medium;

forming an indicator mark image having two portions of differing machine recognizable intensity levels;

projecting said indicator mark image onto said defined indicator mark field; and recording said indicator mark on said indicator mark field contemporaneously with recording a document image on a corresponding frame.

22. For use in combination with a photo recorder for recording the image of a document selectively at any one of a plurality of individual frames on a photo-recording medium, an indicator mark generator forming an image for erasably recording on said medium signifying the recording of an image on said selected frame, comprising:

means for defining a light beam;

a master target intercepting said light beam;

and means for directing said light beam to an indicator mark field at a predetermined position relative to said selected frame, said indicator mark field positioned so that said recorder records said indicator mark on said indicator mark field.

23. The generator of claim 22 wherein said master target forms a machine detectable parameter change in said light beam.

24. The generator of claim 22 wherein said means for defining a light beam includes a chassis defining an aperture through which light passes, and said master target includes area fill covering a portion of said aperture.

25. The generator of claims 22, 23, or 24 wherein said beam directing means defines an optical path from said generator to said indicator mark field, said field being adjacent and in the border area of its corresponding frame.

26. An indicator mark detector for use in combination with a photo-recorder for recording an image of a document at a selected frame of a photo-recording medium, said detector detecting the presence or absence of an indicator mark at a corresponding indicator mark field at a predetermined position relative to said frame, the presence of said mark indicating that its corresponding frame includes an image recorded thereon, said detector comprising:

means for projecting the image of said indicator mark field along an optical path;

sensor means interposed in said path responsive to the image of said indicator mark for exhibiting a first output when said indicator mark is present and a second output when said indicator mark is absent; and means coupled to said sensor means and responsive to a selected one of said first and second outputs for indicating the presence or absence of said indicator mark.

27. The detector of claim 26 wherein a portion of said indicator mark image has an intensity different from the intensity of an image of an indicator mark field having no indicator mark recorded therein, and wherein said sensor means comprises an optical sensor outputting an electrical signal which varies with the intensity of light incident thereon.

28. The detector of claim 27 wherein said indicating means compares said outputted electrical signal to a reference electrical signal.

29. The detector of claim 28 wherein said detector further comprises means for directing a reference light level to said sensor means, said sensor output responsively thereto defining said reference electrical signal.

30. The detector of claim 29 wherein said reference light level directing means comprises a shelf directing light from a light source onto said sensor means.

31. The detector of claim 26 wherein the image of said indicator mark comprises first and second portions differing in a machine-recognizable parameter.

32. The detector of claim 31 wherein the output of said sensor means when said first image portion is sensed corresponds to a reference signal for said indicating means, and wherein said indicating means responds to variations from said reference signal in the output of said sensor means.

33. For use in combination with a recorder for recording the image of a document at a selected frame of a reusable photo-recording medium, a detector for detecting the presence or absence of an indicator mark having darker and lighter areas, comprising:

means for projecting the image recorded at an indicator mark field in a predetermined position relative to a said selected frame along an optical path;

optical sensor means for intercepting light at positions in said optical path, said sensor means exhibiting an electrical parameter which varies with the light level incident thereon; and a comparator coupled to said sensor means and comparing said electrical parameter against a reference signal, the output signal of said comparator indicating the presence or absence of said indicator mark.

34. For use in combination with a recorder for recording the image of a document at a selected frame of a reusable photo-recording medium, a detector for detecting the presence or absence of an indicator mark having darker and lighter areas, comprising:

means for projecting the image recorded at an indicator mark field in a predetermined position relative to a said selected frame along an optical path;

optical sensor means for intercepting light at positions in said optical path, said sensor means exhibiting an electrical parameter which varies with the light level incident thereon; and a comparator coupled to said sensor means and comparing said electrical parameter corresponding to a first position in said optical path against said electrical parameter corresponding to a second position in said optical path, the output of said comparator indicating the presence or absence of said indicator mark.

35. The detector of claim 33 or 34 wherein said sensor means includes first and second sensors positioned at respective first and second positions relative to said optical path, said first position corresponding to said darker portion and said second position corresponding to said lighter portion.

36. The detector of claims 33 or 34 wherein said sensor means comprises a photosensitive device and means for moving said device across said optical path.

37. The detector of claim 36 wherein said moving means comprises an arm operatively engaging said motive means, said device being affixed to said arm, said arm moving in a plane perpendicular to said optical path.

38. The detector of claim 37 further comprising means for indicating the position of said arm.

39. The detector of claim 38 further comprising a switch on said arm and means activating said switch when said device reaches a preselected stationary position with respect to said optical path, said preselected position being within the darker portion of said optical path when said indicator mark is present in said indicator mark field.

40. The detector of claim 39 wherein said switch is an optical switch and said means activating said switch is an encoder held in a fixed position with respect to said recorder and interrupting the optical path of said optical switch when said arm reaches said fixed position.

41. The detector of claims 33 or 34 wherein said comparator includes a voltage restoring circuit coupled to said sensor means, said voltage restoring circuit maintaining a voltage at a particular point therein substantially at a constant level despite long term variations or minor differences in the output of said sensor means at differing parts of said optical path, said voltage restoring circuit responding to major variations in said electrical parameter due to major changes in the level of light incident on said sensor means at said differing parts of said optical path to provide a detectable voltage difference at said circuit.

42. The detector of claim 41 further comprising a logic circuit responsive to said comparator output for preventing document recording despite an operator-entered RECORD command if said indicator mark is present in said indicator mark field.

43. A detector according to claim 42 wherein said logic circuit further includes timer means initiated by said logic circuit for signaling a predetermined time period, said logic circuit preventing recording despite said RECORD command if the end of said time period is signaled before the presence or absence of said indicator mark is determined.

44. A detector according to claim 43 further comprising means for overriding said logic circuit when said indicator mark is detected.

* * * * *

UNITED STATES PATENT AND TRADEMARK OFFICE
CERTIFICATE OF CORRECTION

PATENT NO. : 4,241,992                 Page 1 of 2
DATED : December 30, 1980
INVENTOR(S) : John R. Flint and Heinz Hertel It is certified that error appears in the above—identified patent and that said Letters Patent are hereby corrected as shown below:

Column 1, line 32, after "photoplastic" add --film recorder described therein, the recorder--.

line 37, after "includes" add --apparatus for automatically determining whether a frame is--.

line 59, after "occupied" add --one, and the intended recording of the subsequent document--.

line 64, after "ing" add --thereover despite a user-entered instruction to record.--.

Column 2, line 4, after "the" add --film for each frame thereof. The presence of an indicator--.

Column 3, line 43, after "bisecting" add --the frame 22 so that it can readily be located under--.

line 48, after "the" add --copy plane of copy holding station 12. Upon an appropriate--.

Column 4, line 15, after "is" add --energized for approximately one to two seconds. It is--.

line 57, after "24" add --is located adjacent its corresponding frame 22 in a border--.

UNITED STATES PATENT AND TRADEMARK OFFICE
CERTIFICATE OF CORRECTION

PATENT NO. : 4,241,992     Page 2 of 2
DATED      : December 30, 1980
INVENTOR(S) : John R. Flint and Heinz Hertel It is certified that error appears in the above-identified patent and that said Letters Patent are hereby corrected as shown below:

Column 7, line 33, after "current" add --through the emitter of sensor 150. At a subsequent time $T_1$--.

Signed and Sealed this

Twenty-fourth Day of March 1981

[SEAL]

*Attest:*

RENE D. TEGTMEYER

*Attesting Officer*     *Acting Commissioner of Patents and Trademarks*